United States Patent [19]

Cone

[11] Patent Number: 5,690,382

[45] Date of Patent: *Nov. 25, 1997

[54] ADJUSTABLE CHILD-RESTRAINT SHIELD

[75] Inventor: Richard E. Cone, Athens, Ohio

[73] Assignee: Cosco, Inc., Columbus, Ind.

[*] Notice: The term of this patent shall not extend beyond the expiration date of Pat. No. 5,527,090.

[21] Appl. No.: 556,208

[22] Filed: Nov. 9, 1995

[51] Int. Cl.[6] ................................. A47D 1/10; B60N 2/28
[52] U.S. Cl. .................... 297/256.15; 297/487; 297/488
[58] Field of Search ........................... 297/256.15, 487, 297/488, 150, 154

[56] References Cited

U.S. PATENT DOCUMENTS

| D. 266,634 | 10/1982 | Knoedler et al. . | |
|---|---|---|---|
| 2,349,092 | 5/1944 | Hammer | 297/150 |
| 2,357,556 | 9/1944 | Sheldrick | 297/150 |
| 2,532,556 | 12/1950 | Keough | 297/487 |
| 2,799,324 | 7/1957 | Anderson . | |
| 2,963,076 | 12/1960 | Hyman | 297/154 |
| 3,330,597 | 7/1967 | Lay et al. . | |
| 3,475,052 | 10/1969 | Kaposi . | |
| 3,802,527 | 4/1974 | Tezuka . | |
| 4,039,225 | 8/1977 | Tomforde . | |
| 4,067,608 | 1/1978 | Von Wimmersperg . | |
| 4,082,350 | 4/1978 | Tomforde . | |
| 4,105,247 | 8/1978 | Saint . | |
| 4,159,127 | 6/1979 | Czernakowski et al. . | |
| 4,190,288 | 2/1980 | Korger . | |
| 4,342,483 | 8/1982 | Takada . | |
| 4,429,916 | 2/1984 | Hyde et al. . | |
| 4,456,302 | 6/1984 | Knoedler et al. . | |
| 4,485,892 | 12/1984 | Maloney et al. . | |
| 4,500,135 | 2/1985 | Kincheloe . | |
| 4,582,359 | 4/1986 | Wise et al. . | |
| 4,634,185 | 1/1987 | Kassai | 297/487 |
| 4,662,683 | 5/1987 | Knoedler et al. . | |
| 4,687,255 | 8/1987 | Klanner et al. . | |
| 4,729,600 | 3/1988 | Single, II et al. . | |
| 4,743,064 | 5/1988 | Takizawa . | |
| 4,754,999 | 7/1988 | Kain | 297/256.15 |
| 4,807,928 | 2/1989 | Cone . | |
| 4,842,331 | 6/1989 | Waples . | |
| 4,880,277 | 11/1989 | Takahashi et al. . | |
| 4,909,574 | 3/1990 | Sedlack . | |
| 4,968,092 | 11/1990 | Giambrone . | |
| 5,061,012 | 10/1991 | Parker . | |
| 5,183,311 | 2/1993 | Meeker et al. . | |
| 5,427,432 | 6/1995 | Meeker et al. | 297/256.15 |
| 5,607,203 | 3/1997 | Sedlack | 297/256.15 |

FOREIGN PATENT DOCUMENTS 1243930  11/1988  Canada .

*Primary Examiner*—Peter M. Cuomo
*Assistant Examiner*—Anthony D. Barfield
*Attorney, Agent, or Firm*—Barnes & Thornburg

[57] ABSTRACT

A child car seat is provided for restraining a child seated in the car seat. The child car seat includes a seat assembly and a restraint shield. The restraint shield includes a fixed portion coupled to the seat assembly and a movable portion configured to move relative to the fixed portion and seat assembly between a plurality of positions. The movable portion is formed to include an interior region and the fixed portion is positioned to lie wholly in the interior region of the movable portion.

49 Claims, 6 Drawing Sheets

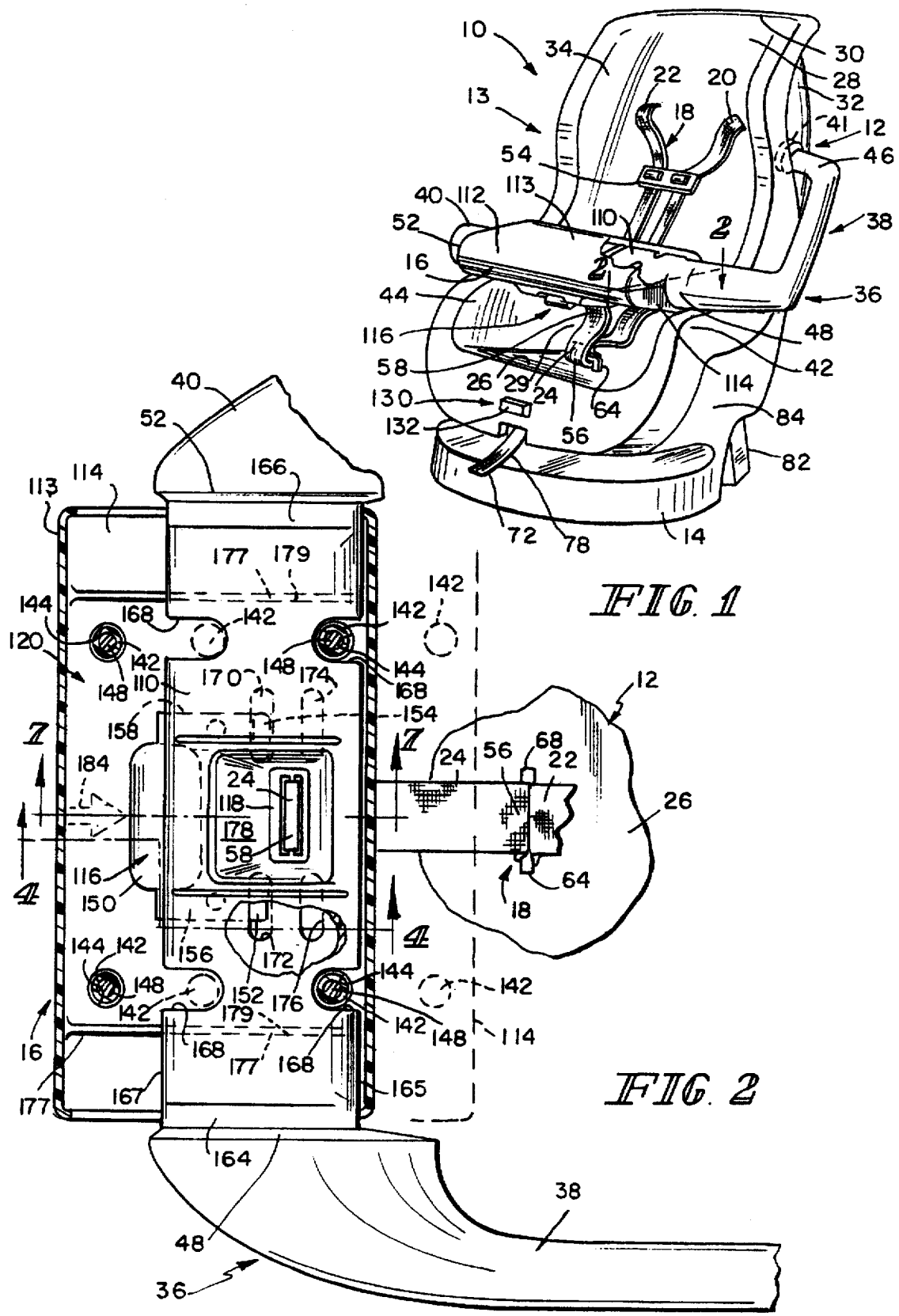

5,690,382

ADJUSTABLE CHILD-RESTRAINT SHIELD

BACKGROUND AND SUMMARY OF THE INVENTION

The present invention relates to child car seats, and particularly to child car seats having restraint systems for minimizing injury to a seated child in case the vehicle in which the seat is being used stops suddenly or is involved in an accident. More particularly, the present invention relates to a child car seat with a restraint shield positioned in front of a child seated in the child car seat.

Child car seats having movable safety shields are known. See, for example, U.S. Pat. No. 4,909,574 to Sedlack; U.S. Pat. No. 4,500,135 to Kincheloe; U.S. Pat. No. 4,159,127 to Czernakowski et al.; U.S. Pat. No. 4,190,288 to Korger; U.S. Pat. No. 4,429,916 to Hyde et al.; and U.S. Pat. No. 5,061,012 to Parker et al.; and Canadian Patent No. 1,243,930. It is also known to provide abdominal shields in child car seats. See, for example, U.S. Pat. No. 4,456,302 to Knoedler et al.; U.S. Pat. No. 4,662,683 to Knoedler et al.; U.S. Pat. No. 4,880,277 to Takahashi et al.; U. S. Pat. No. 4,687,255 to Klanner et al.; and U.S. Pat. No. 4,342,483 to Takada. A child car seat having a pair of spaced-apart pivotable swing arms and a barrier shield mounted on free ends of the swing arms for pivotable movement relative to the swing arms is disclosed in U.S. patent application Ser. No. 08/131,216 to Cone.

It is also known to provide a release or latch mechanism for a user to operate to move a safety shield relative to a child car seat. See, for example, U.S. patent application No. 08/334,599 to Cone, and U.S. Pat. No. 4,909,574 to Sedlack, U.S. Pat. No. 4,807,928 to Cone, U.S. Pat. No. 4,485,892 to Maloney et al., U.S. Pat. No. 4,842,331 to Waples, U.S. Pat. No. 3,375,052 to Kaposi, U.S. Pat. No. 2,799,324 to Anderson, and U.S. Pat. No. 4,582,359 to Wise et. al.

What is needed is an improved child car seat provided with a child-restraint shield that is adjustable to accommodate children of different sizes in the child car seat. An adjustable restraint shield that automatically adjusts the position of a crotch strap to provide a safe, comfortable fit for different-sized children once a child has been seated and as the position of the restraint shield is set would be welcomed by consumers.

According to the present invention, a child car seat is provided for restraining a child seated in the car seat. The child car seat includes a seat assembly and an adjustable restraint shield.

The restraint shield includes several components that move relative to one another so that the position of the restraint shield can be adjusted to accommodate different-sized children sitting in the child seat. The restraint shield includes a fixed portion coupled to the seat assembly and a movable portion configured to move relative to the fixed portion between a plurality of positions. The movable portion includes an interior region and the fixed portion is positioned to lie in the interior region of the movable portion.

In preferred embodiments, the seat assembly includes a seat shell and a swing arm unit that connects the adjustable restraint shield to the seat shell. The swing arm unit includes right and left swing arms each having one end appended to the seat shell and another end connected to the fixed portion of the restraint shield. Preferably, the swing arms move upwardly and downwardly along arcs to position the adjustable restraint shield in one position in front of a child sitting in the child seat or in other positions up and away from the seated child.

The seat shell includes a seat bottom portion and a seat back portion. The movable portion of the restraint shield can be moved relative to the fixed portion of the restraint shield and the swing arm unit to provide more or less space between the restraint shield and the seat back portion formed in the seat shell to accommodate different-sized children in the seat shell. The swing arm unit also includes a spring mechanism that is arranged to urge the swing arms up and away from the child.

A harness assembly is provided to retain a child in a seated position between the adjustable restraint shield and the seat back portion. The harness assembly includes a pair of shoulder straps placed against the child's shoulders and a crotch strap arranged to pass between the child's legs and connect the shoulder straps to the restraint shield.

The crotch strap includes one end linked to the shoulder straps and seat bottom portion and another end connected to the restraint shield. The crotch strap is linked to the seat bottom portion by a seat assembly buckle that is connected to the seat bottom portion of the child seat. The crotch strap is linked to the seat bottom portion to keep the swing arms down in front of the child against a force applied by the spring mechanism. The crotch strap is attached to the restraint shield so that as the restraint shield changes positions, the crotch strap "moves" the restraint shield down toward the seat bottom portion against the force applied by the spring mechanism of the swing arm unit or up and away from the seat bottom portion with the force of the spring mechanism of the swing arm unit.

A user can move the adjustable restraint shield to any one of its many positions close to or away from the seat back portion with one hand by first activating a latch mechanism provided in the restraint shield and then moving the movable portion relative to the fixed portion. The latch mechanism includes an inner part that extends into the interior region of the movable portion to engage the fixed portion and an outer part that is exposed to provide a grip handle for a user to access. A user is able to use the "one-handed" operation because the latch mechanism is coupled to the movable portion to move with the movable portion as it moves relative to the fixed portion between the plurality of positions. Thus, to adjust the restraint shield the user need only grasp the movable portion and latch mechanism with one hand, activate the latch mechanism by pressing on the grip handle with the same hand to disengage the inner part of the latch mechanism from the fixed portion, and then move the movable portion of the restraint shield with the same hand.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a perspective view of a child car seat in accordance with the present invention showing a seat assembly including a seat shell having a seat bottom portion and a seat back portion and a pair of swing arms, an adjustable restraint shield having a fixed portion mounted to the pair of swing arms and a movable portion able to move relative to the fixed portion toward and away from the seat back portion to accommodate children of different sizes sitting in the child seat, and a harness assembly including a pair of shoulder straps and a crotch strap attached to the adjustable restraint shield on one end and to a buckle anchored to the seat bottom portion on another end;

FIG. 2 is a cross-sectional view taken along line 2—2 of FIG. 1 of a portion of each swing arm and the adjustable restraint shield of FIG. 1 and showing the movable portion in an outer position (solid lines) away from the seat back portion and an inner position (dotted lines) closer to the seat back portion;

FIG. 4 is a cross-sectional view taken along line 4—4 of FIG. 2 showing the fixed portion of the restraint shield being formed to include first and second notches and the latch mechanism having a detent engaging the first notch to position the movable portion in an outer position relative to the fixed portion and seat bottom portion;

FIG. 5 is a cross-sectional view similar to FIG. 4 showing a user pressing on the grip handle of the latch mechanism to pivot the lever arms about a pivot axis and disengage the detent from the first and second notches so that the movable portion may move relative to the fixed portion and swing arms to the outer position, shown in FIG. 4, a middle position by placing the detent of the latch mechanism in the second notch, or the inner position by placing the detent of the latch mechanism adjacent to a back side of the fixed portion, shown in FIG. 6;

FIG. 6 is a cross-sectional view similar to FIG. 4 showing the detent of the latch mechanism engaging the back side of the fixed portion to position the movable portion in the inner position relative to the fixed portion and seat back portion;

DETAILED DESCRIPTION OF THE DRAWINGS

Figure 3:
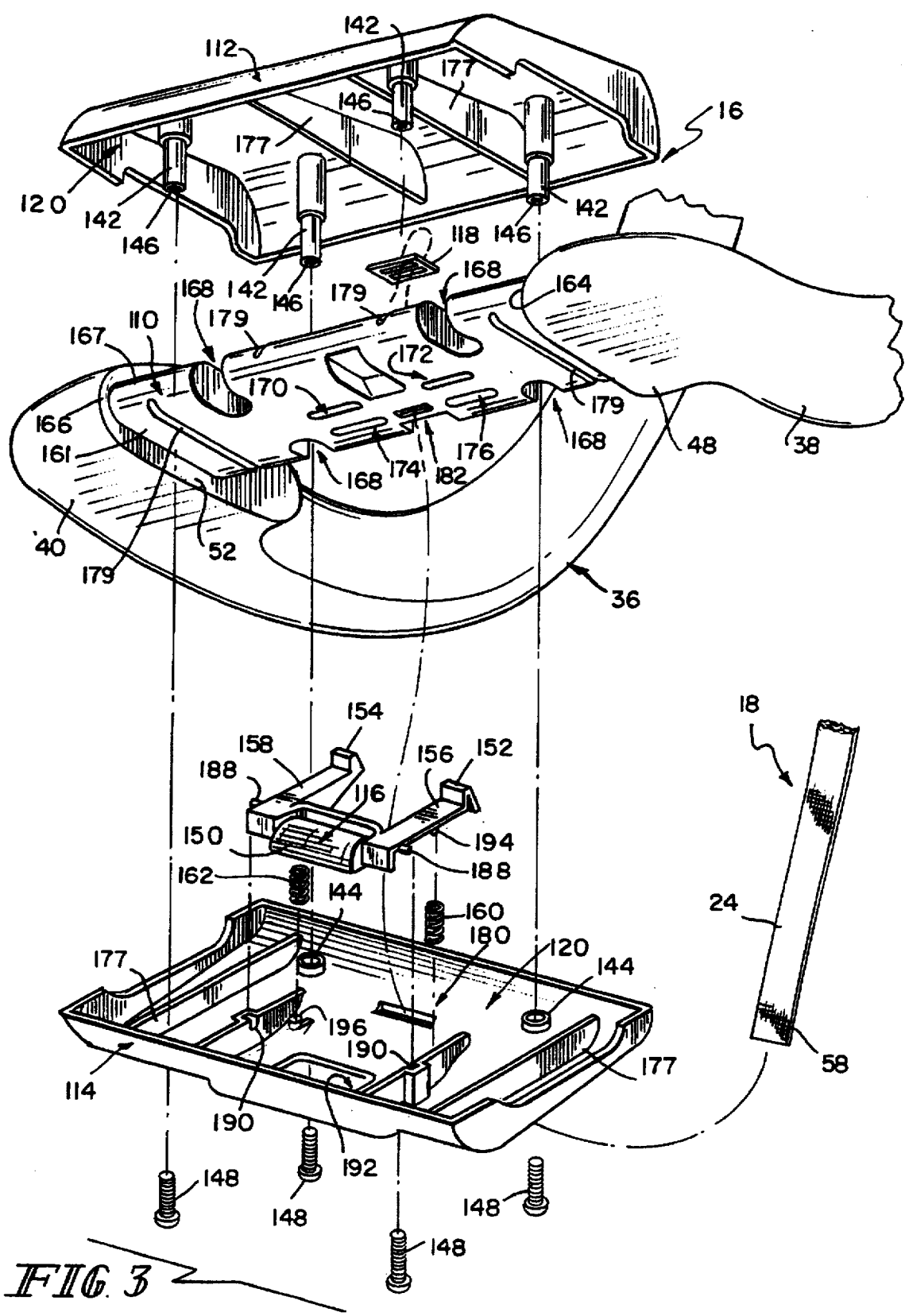
FIG. 3 is an exploded perspective view of the adjustable restraint shield of FIGS. 1 and 2 showing the fixed portion attached to free ends of the pair of swing arms, a top and bottom housing shell that can be mated to define the movable portion and an interior region containing the fixed portion, a latch mechanism including a grip handle, a pair of latch arms, and some springs, and the crotch strap having a free end that passes through crotch strap-receiving apertures formed in the bottom housing shell and fixed portion and attaches to a restraint shield buckle that is assembled within the fixed portion.

A child car seat 10 includes a seat assembly 13 and an adjustable restraint shield 16 coupled to seat assembly 13 as shown in FIG. 1. Adjustable restraint shield 16 is provided for restraining forward movement of a child sitting in seat 10 during a sudden vehicle stop. Seat assembly 13 includes a seat shell 12 and a swing arm unit 36 as shown in FIG. 1. Adjustable restraint shield 16 is mounted on free ends 48, 52 of right and left swing arms 38, 40 of swing arm unit 36. Preferably, swing arms 38, 40 move restraint shield 16 along a swing arm unit path 186 between one position in front of a child (not shown) seated in child seat 10 and other positions up and away from a child (not shown) seated in child seat 10.

Adjustable restraint shield 16 includes a fixed portion 110 connected to free ends 48, 52 of swing arms 38, 40 and a movable portion 113 that moves between a plurality of positions relative to fixed portion 110 to accommodate different-sized children. With only one hand, a user can operate a latch mechanism 116 provided on the adjustable restraint shield 16 to move movable portion 113 relative to fixed portion 110 between the plurality of positions as shown, for example, in FIGS. 4-6.

Children and infants are also restrained within seat shell 12 by a harness assembly 18 shown in FIG. 1. Harness assembly 18 includes left and right shoulder straps 20, 22 and a crotch strap 24 connected to adjustable restraint shield 16 as shown in FIG. 1. Crotch strap 24 "moves" adjustable restraint shield 16 relative to seat shell 12 to accommodate for the different-sized children sitting in seat shell 12 as movable portion 113 of restraint shield 16 moves relative to fixed portion 110 of restraint shield 16.

Seat shell 12 includes a seat bottom portion 26 for supporting a child's bottom and upper legs, a seat back portion 28 appended to and extending upwardly from a back edge 29 of seat bottom portion 28, and first and second side walls 32, 34 as shown in FIG. 1. Seat back portion 28 preferably has a greater height than the "height" of the child sitting in seat 10 so that a top portion 30 of seat back portion 28 is above the top of the child's head when the child is seated in seat 10. First and second side walls 32, 34 include first and second side arm portions 42, 44 and are provided to prevent lateral movement of the child in seat 10. In the illustrated embodiment of the present invention, seat 10 is molded out of a plastics material. A cushion (not shown) can be nested and mounted in seat 10 for added comfort.

Figure 4:
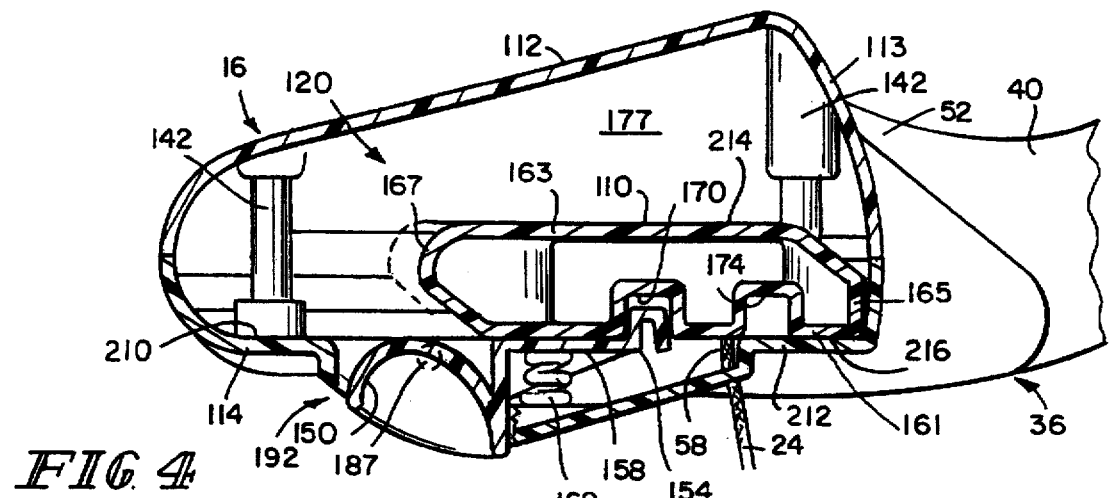
FIGS. 4-6 show movement of the movable portion of the restraint shield relative to the fixed portion from the outer position, shown in FIG. 4, to the inner position, shown in FIG. 6.
Figure 5:
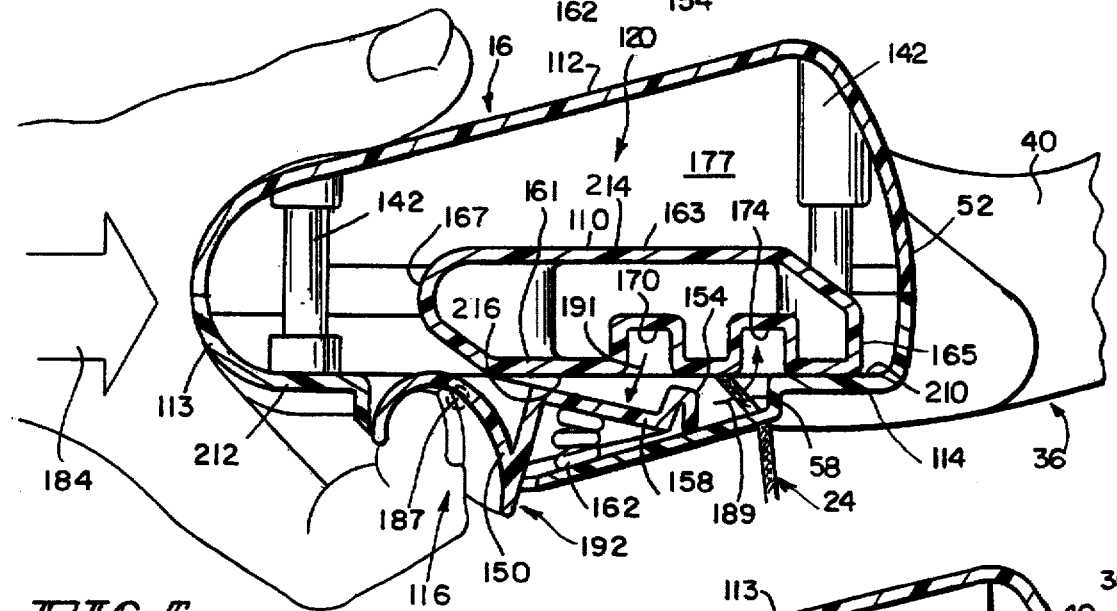
Figure 6:
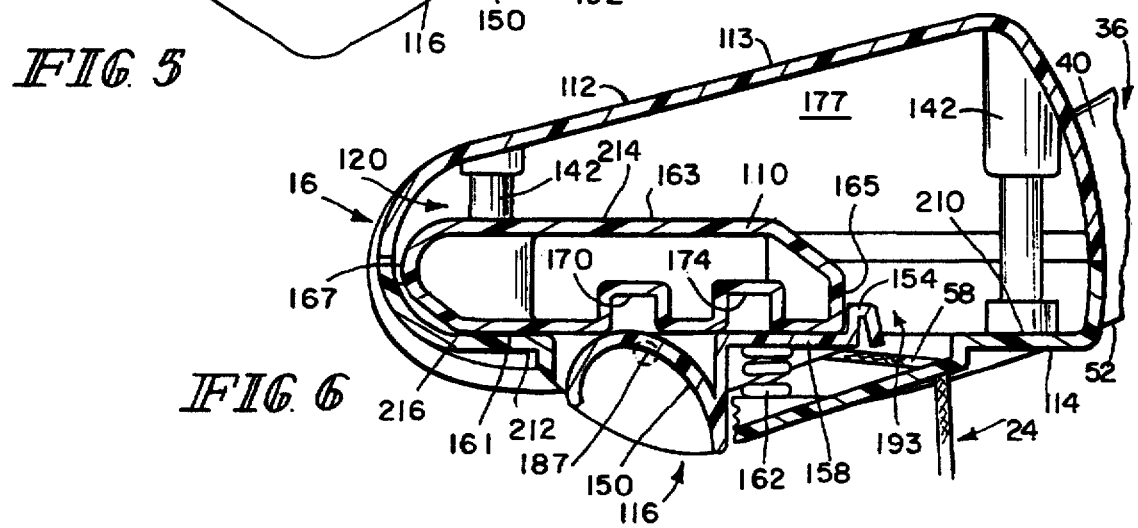

The components of restraint shield 16 are shown in an exploded view in FIG. 3. Restraint shield 16 includes fixed portion 110, movable portion 113 having a top housing shell 112 and a bottom housing shell 114, latch mechanism 116, and a restraint shield buckle 118. Top housing shell 112 and bottom housing shell 114 of movable portion 113 are configured to attach to each other to form a hollow interior region 120 therebetween. Fixed portion 110, part of latch mechanism 116, and restraint shield buckle 118 are situated within interior region 120. Bottom housing shell 114 includes an upper surface 210 facing upwardly toward the top housing shell 112 and a lower surface 212 facing downwardly away from the top housing shell 112 as shown in FIGS. 4–6. Fixed portion 110 includes an upper surface 214 facing upwardly toward top housing shell 112 and a lower surface 216 facing downwardly toward bottom housing shell 214 as shown in FIGS. 4–6. Latch mechanism 116 is operated by a user to move movable portion 113 relative to child seat 10 and fixed portion 110 toward or away from seat back portion 28 so that restraint shield 16 fits properly against any size child sitting in child seat 10 to accommodate for different-sized children.

Adjustable restraint shield 16 is attached to swing arm unit 36 that travels along swing arm unit path or arc 186. In the illustrated embodiment of the present invention, swing arm unit 36 is a blow-molded, unitary, U-shaped member. Swing arm unit 36 includes left swing arm 38, right swing arm 40, and a spring mechanism 41 configured to bias left and right swing arms 38, 40 upward away from seat bottom portion 26. Left swing arm 38 includes a first end 46 pivotably connected to first side wall 32 and a second end 48 appended to adjustable restraint shield 16. Right swing arm 40 includes a first end (not shown) pivotably connected to second side wall 34 and a second end 52 appended to adjustable restraint shield 16. Swing arm unit 36 is configured to move restraint shield 16 along swing arm unit path 186 between a position in front of a child sitting in child seat 10, shown in FIGS. 9 and 10, to a position up and away from the child sitting in the child seat.

Figure 9:
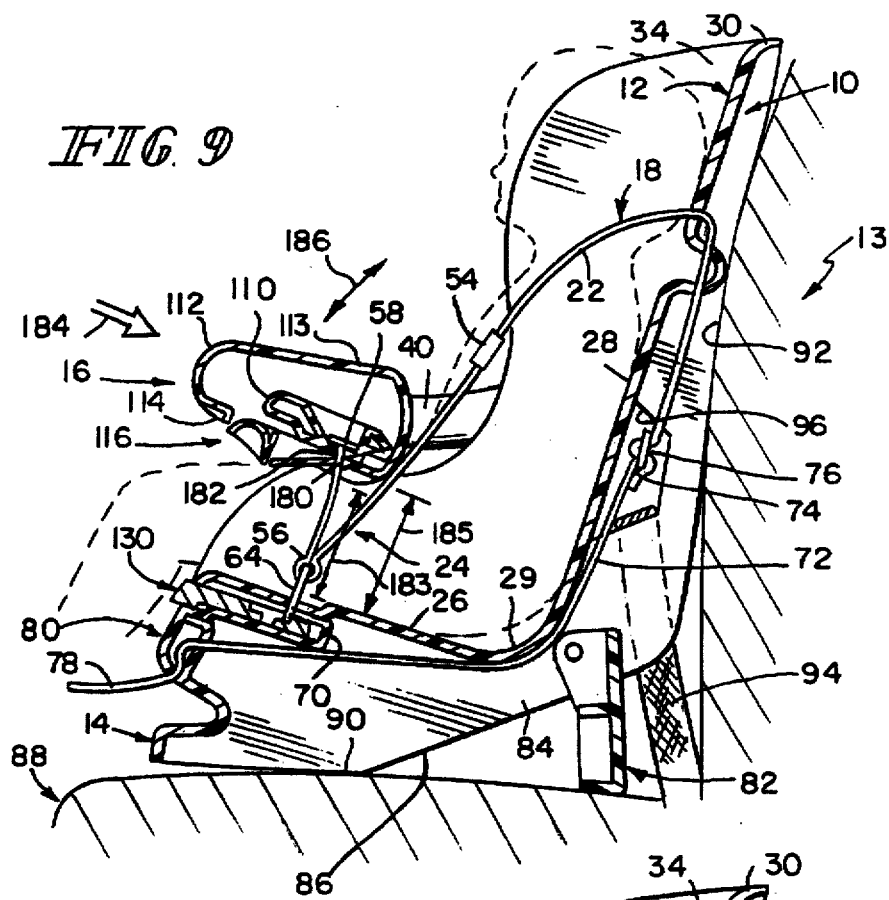
FIG. 9 is a sectional view of the child car seat of FIG. 1 lying in place on a passenger seat in a vehicle and carrying a child restrained by a harness assembly and the restraint shield, the movable portion of the restraint shield being situated in the outer position relative to the fixed portion and seat back portion, as shown in FIGS. 4 and 7, to accommodate the relatively large size of the child sitting in the child seat.
Figure 10:
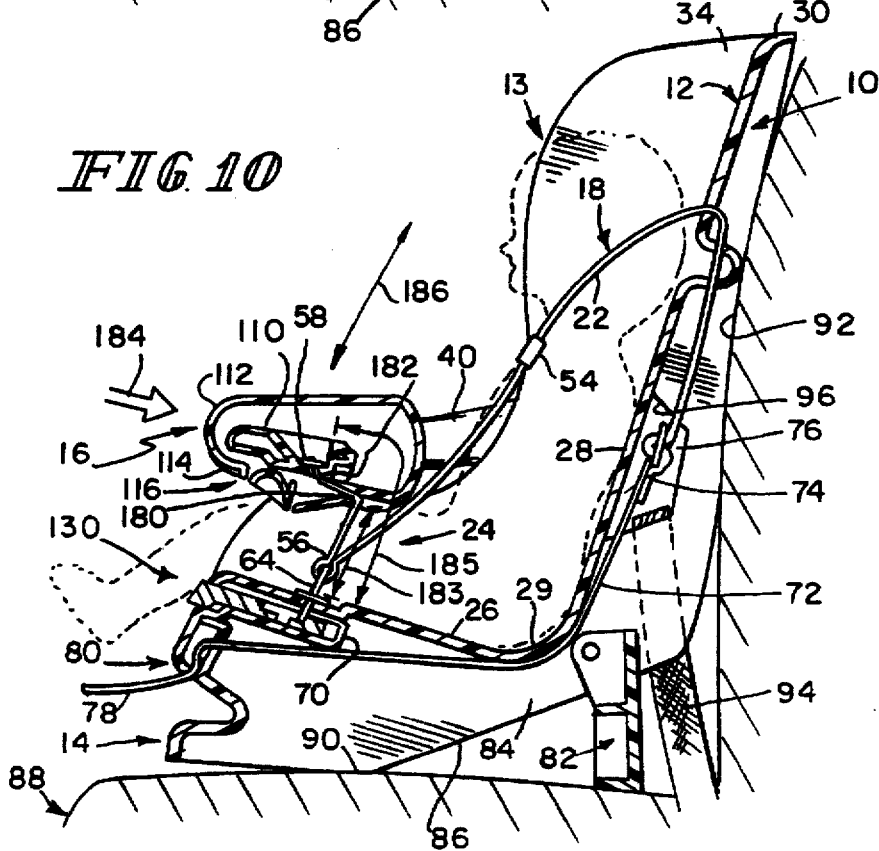
FIG. 10 is a view similar to FIG. 9 showing the restraint shield when the movable portion is in the inner position relative to the fixed portion and seat back portion, as shown in FIGS. 6 and 8, to accommodate the relatively small size of the child sitting in the child seat.
Figure 11:
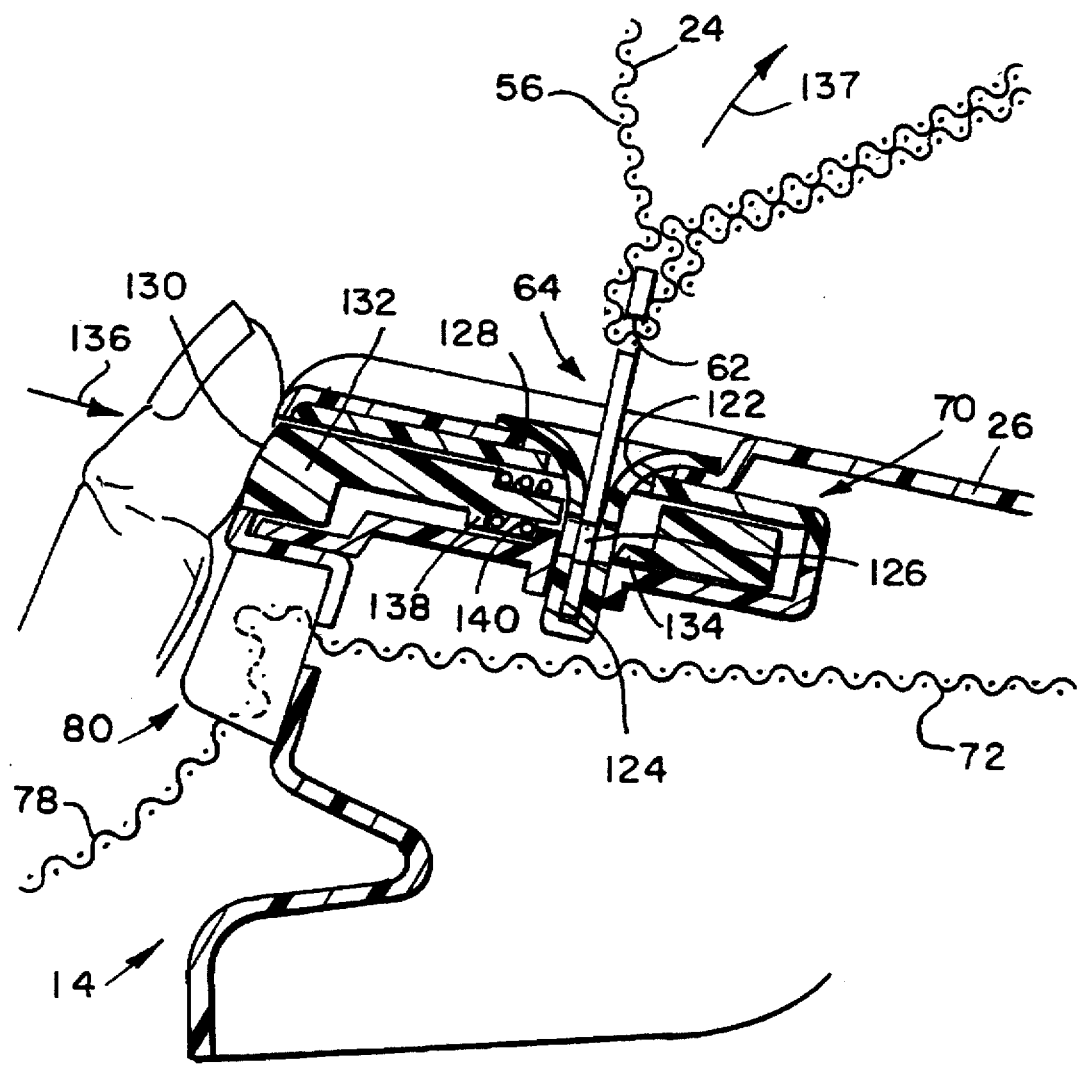
FIG. 11 is an enlarged view of the buckle case mounted in the seat bottom portion of the seat shell and shown in FIGS. 9 and 10 showing a user manually pushing a spring-loaded push button in an inward direction to disengage a locking bar from the buckle tongue so that the user can withdraw the buckle tongue of the crotch strap-carrying bracket from engagement with the buckle case.

Harness assembly 18 further includes a harness restraint 54 through which left and right shoulder straps 20, 22 extend as shown in FIG. 1. Right shoulder strap 22 is coupled to harness restraint 54 and left shoulder strap 20 is releasably coupled to harness restraint 54. Left and right shoulder straps 20, 22 and crotch strap 24 are connected to a slot 62 formed in a seat assembly buckle 64. Shoulder straps 20, 22 are fixed to seat back portion 28 of child car seat 10 and extend from seat assembly buckle 64 through apertures formed in seat back portion 28 of seat shell 12. Crotch strap 24 has a first end 56 connected to seat assembly buckle 64 and a second end 58 connected to adjustable restraint shield 16. Buckle 64 includes a buckle tongue 66 that is releasably received in a buckle-receiving slot 68 provided in a buckle case 70 that is mounted in seat bottom portion 26 of seat shell 12 as shown in FIGS. 9–11. The operation of buckle 64 and buckle case 70 will be described in more detail below.

Harness assembly 18 also includes a bottom strap 72 having an upper end 74 coupled to shoulder straps 20, 22 at a first A-lock unit 76 as shown in FIGS. 9 and 10. Bottom strap 72 has a lower end 78 passing through a second A-lock unit 80. These A-lock units 76, 80 are conventional mechanisms and operate in the conventional way to manage adjustment of harness assembly 18.

In use, a child is placed in a normal seating position in seat 10 as shown in FIGS. 9 and 10 and harness assembly 18 is arranged to position crotch strap 24 between the child's legs and shoulder straps 20, 22 against the child's shoulders. Crotch strap 24 pulls restraint shield 16 downwardly toward seat bottom portion 26 against the force of spring mechanism 41 of swing arm unit 36 to hold restraint shield 16 in front of the child sitting in child seat 10.

The components of restraint shield 16 are shown in an exploded view in FIG. 3. Top housing shell 112 and bottom housing shell 114 are connected together to form restraint shield movable portion 113 that moves relative to fixed portion 110 of restraint shield 16. Top housing shell 112 includes spaced-apart posts 142 that extend into spaced-apart post-receiving apertures 144 formed in bottom housing shell 114. Spaced-apart posts 142 are formed to include apertures 146 for receiving screws 148. Screws 148 extend into spaced-apart post-receiving apertures 144 and screw into apertures 146 of spaced-apart posts 142 to connect top and bottom housing shells 112, 114.

Latch mechanism 116 is operated by a user to move movable portion 113 relative to fixed portion 110 and seat shell 12 toward or away from seat back portion 28 to accommodate and provide a snug, comfortable fit for different-sized children sitting in child seat 10. Latch mechanism 116 includes a grip handle 150, spaced-apart first and second detents 152, 154, spaced-apart first and second lever arms 156, 158, and first and second springs 160, 162. All the components of latch mechanism 116 are situated within interior region 120 of movable portion 113 except grip handle 150. Grip handle 150 extends outside of movable portion 113 so that a user can access grip handle 150 to activate latch mechanism 116. First and second lever arms 156, 158 extend between first and second detents 152, 154 and engage first and second springs 160, 162. First and second lever arms 156, 158 include spring posts 194 and bottom shell 114 includes spaced-apart spring posts 196 for engaging and securing first and second springs 160, 162.

Latch mechanism 116 pivots about a pivot axis 187 defined by pivot posts 188 appended to first and second lever arms 156, 158. Pivot posts 188 are situated within pivot post-receiving slots 190 formed in bottom housing shell 114 to secure latch mechanism 116 to bottom housing shell 114. Bottom housing shell 114 is also formed to include a latch-accessing aperture 192. Grip handle 150 extends through latch-accessing aperture 192 so that a user can access grip handle 150.

Fixed portion 110 includes a bottom side 161 facing downwardly toward bottom housing shell 114, top side 163 facing upwardly toward top housing shell 112, back side 165 facing toward seat back portion 28 of seat shell 12, front side 167 facing away from seat back portion 28, first end 164 appended to left swing arm 38, and second end 166 appended to right swing arm 40. As shown in FIGS. 3–8, fixed portion 110 is formed to include several slots and apertures. Spaced-apart post-receiving slots 168 are formed in fixed portion 110 for receiving spaced-apart posts 142 of top housing shell 112. Posts 142 travel through slots 168 as movable portion 113 moves relative to fixed portion 110 and seat back portion 28 between an outer position (shown in solid lines) and an inner position (shown in dotted lines) as shown in FIG. 2.

Fixed portion 110 is also formed to include spaced-apart detent-receiving apertures or notches 170, 172, 174, 176 for receiving spaced-apart first and second detents 152, 154 of latch mechanism 116. As shown in FIG. 5, latch mechanism 116 can be actuated by a user to move top and bottom shells 112, 114 of movable portion 113 relative to intermediate portion 110 and seat shell 12 along a plane 184 that is substantially parallel to seat bottom portion 26. Detents 152, 154 of latch mechanism 116 can be placed in one of three positions: 1) Detents 152, 154 can be placed in detent-receiving notches 170, 172 to place movable portion 113 in an outer position relative to intermediate portion 110 and seat shell 12 as shown in FIG. 4, 2) Detents 152, 154 can be placed in detent-receiving notches 174, 176 (by moving detents in direction 189 as shown in FIG. 5) to place movable portion 113 in a middle position relative to fixed portion 110 and seat shell 12, and 3) Detents 152, 154 can be placed adjacent to back side 165 of fixed portion 110 to place movable portion 113 in an inner position relative to fixed portion 110 and seat shell 12 as shown in FIG. 6. It is within the scope of the present invention to provide two or more discrete positions or means for allowing latch mechanism 116 to engage fixed portion 110 at two or more positions.

Movable portion 113 is guided between the outer, middle, and inner positions by spaced-apart guides 177 formed in top and bottom housing shells 112, 114 and situated within spaced-apart guide-receiving slots 179 formed in bottom side 161 and top side 163 of fixed portion 110. Guides 177 travel through guide-receiving slots 179 as movable portion 113 moves between the inner, middle, and outer positions relative to fixed portion 110.

A user can operate latch mechanism 116 to release movable portion 113 from fixed portion 110 and then move movable portion 113 between the inner, middle, and outer positions with only one hand. A user is able to use a "one-handed" operation because latch mechanism 116 is mounted to bottom housing shell 112 and thus moves with movable portion 113 as movable portion 113 moves relative to fixed portion 110 and seat back portion 28. To adjust restraint shield 16, the user need only grasp movable portion 113 and latch mechanism 116 with one hand, push on grip handle 150 with the same hand to activate latch mechanism 116 and disengage latch mechanism 116 from fixed portion 110, and move movable portion 113 of restraint shield 116 to the desired position relative to seat back portion 28 with the same hand.

To move top and bottom shells 112, 114 between the inner, middle, and outer positions, a user presses on grip handle 150 of latch mechanism 116 to disengage detents 152, 154 from detent-receiving apertures 170, 172, 174, 176 or back side 165 of fixed portion 110 as shown in FIG. 5. When a user presses on grip handle 150, first and second lever arms 156, 158 depress first and second springs 160, 162 in pivot direction 191 so that detents 152, 154 disengage fixed portion 110. When grip handle 150 is released, first and second springs 160, 162 expand in spring-urged pivot direction 193 to force detents 152, 154 into detent-receiving notches 170, 172 (outer position) shown in FIG. 4, detent-receiving notches, 174, 176 (middle position), or adjacent to back side 165 of fixed portion 110 (inner position) shown in FIG. 6.

Figure 7:
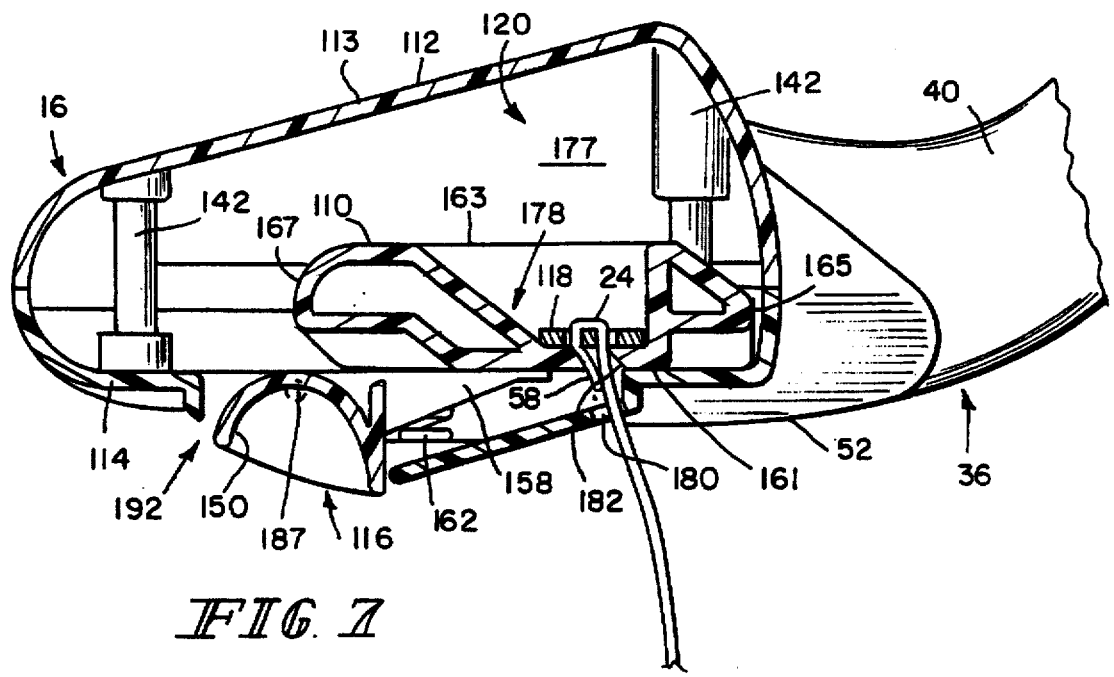
FIG. 7 is a cross-sectional view taken along line 7—7 of FIG. 2 showing the crotch strap attached to the restraint shield bracket situated within a cavity formed in the fixed portion and the position of the crotch strap when the movable portion is situated in the outer position relative to the fixed portion as shown in FIG. 4.
Figure 8:
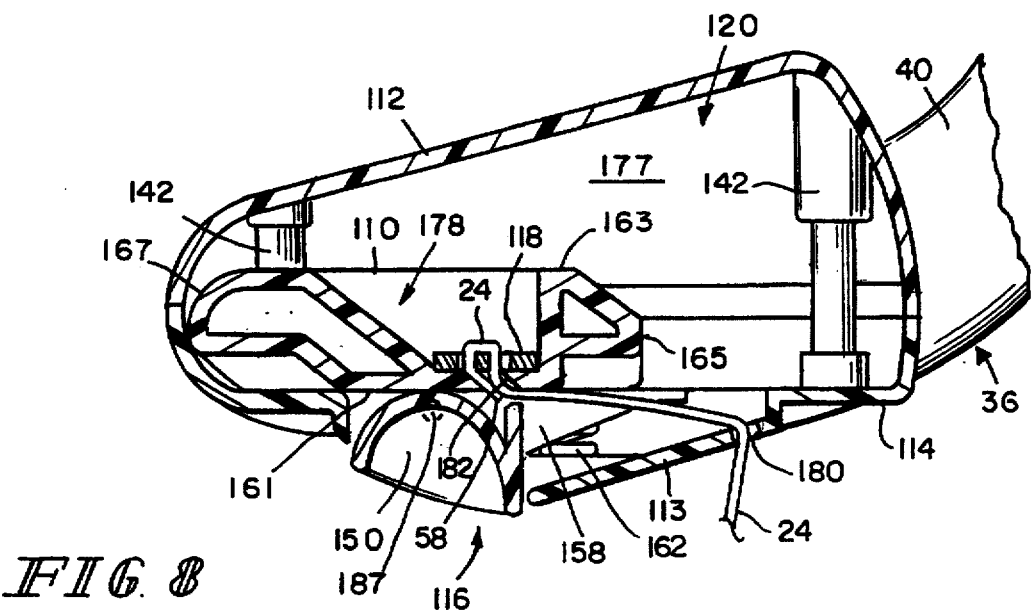
FIG. 8 is a cross-sectional view similar to FIG. 7 showing the position of the crotch strap when the movable portion is situated in the inner position relative to the fixed portion as shown in FIG. 6.

Top side 163 of fixed portion 110 is formed to include a cavity 178 for receiving restraint shield buckle 118 as shown in FIGS. 2, 7, and 8. Restraint shield buckle 118 may be attached to fixed portion 110 or lie within cavity 178 unattached to fixed portion 110 to couple or append second end 58 of crotch strap 24 to fixed portion 110. Second end 58 of crotch strap 24 extends through a crotch strap-receiving aperture 180 formed in bottom housing shell 114 of movable portion 113 and a crotch strap-receiving aperture 182 formed in bottom side 161 of fixed portion 110 before engaging restraint shield buckle 118. Second end 58 of crotch strap 24 remains stationary relative to fixed portion 110 as movable portion 113 moves relative to fixed portion 110 and seat back portion 28.

Crotch strap 24 has a first length 183 defined between crotch strap-receiving aperture 180 and first end 56 of crotch strap 24 and a second length 185 defined between crotch strap-receiving aperture 182 and first end 56 of crotch strap 24. As movable portion 113 moves relative to fixed portion 110 and seat shell 12, first length 183 of crotch strap 24 changes while second length 185 of crotch strap 24 remains constant as shown in FIGS. 9 and 10.

FIGS. 7 and 9 show the position of crotch strap 24 when movable portion 113 is in the outer position (i.e. when detents 152, 154 are situated in detent-receiving apertures 170, 172 as shown in FIG. 4). FIGS. 8 and 10 show the position of crotch strap 24 when movable portion 113 is in the inner position (i.e. when detents 152, 154 are situated adjacent to back side 165 of fixed portion 110 as shown in FIG. 6).

As movable portion moves from the outer position, shown in FIGS. 7 and 9, to the inner position, shown in FIGS. 8 and 10, first length 183 of crotch strap 24 decreases. The decreased length 183 of crotch strap 24 between crotch strap-receiving aperture 180 and first end 56 of crotch strap 24 results in crotch strap 24 pulling restraint shield 16 downwardly toward seat bottom portion 26 against the force of spring mechanism 41 of swing arm unit 36 as shown in FIG. 10. When movable portion 113 is moved from the inner position, shown in FIGS. 8 and 10, toward the outer position, shown in FIGS. 7 and 9, first length 183 of crotch strap 24 increases and restraint shield 16 moves upwardly away from seat bottom portion 26 due to the force of spring mechanism 41 of swing arm unit 36 as shown in FIG. 9.

When a user operates latch mechanism 116 to move movable portion 113 relative to fixed portion 110 and seat back portion 28, two movements occur: 1) Movable portion 113 moves along plane 184 relative to fixed portion 110 and 2) Restraint shield 16 moves along swing arm unit path 186 of swing arm unit 36 due to the change in first length 183 of crotch strap 24. Together, these two movements provide a snug, comfortable fit to accommodate different-sized children sitting in child seat 10.

Child car seat 10 is easily set up for use as a forward-facing seat by pivoting a pivotable support leg 82 to its unfolded seat-engaging position shown in FIGS. 1, 9, and 10. Alternatively, pivotable support leg 82 can be pivoted toward a bottom area 84 of base 14 to its retracted position (not shown) to permit a user to mount child car seat 10 on passenger seat 88 so that a bottom wall 86 of base 14 rests directly on seat 90 and the seated child faces toward seat back 92. In either case, a vehicle belt assembly 94 on passenger seat 88 passes through an aperture 96 formed in child car seat 10 to hold child car seat 10 in a fixed position on passenger seat 88.

Buckle case 70 is shown in greater detail in FIG. 11. Buckle case 70 is mounted to lie underneath seat bottom portion 26 of seat shell 12 and is formed to include a top-opening slot 122 for receiving seat assembly buckle 64. Buckle 64 is formed to include slot 62. Crotch strap 24 and left and right shoulder straps 20, 22 are coupled to slot 62. Buckle 64 also includes a tongue 124 that is formed to include a lower latch-receiving slot 126 as shown best in FIG. 11. Illustratively, a cover 128 is optionally mounted on buckle tongue 124 and is provided to guide entry of buckle tongue 124 into top-opening slot 122 formed in buckle case 70.

A push-button assembly 130 is provided in buckle case 70 for releasing and retaining buckle 64 in buckle case 70. Push button assembly 130 includes a push-button member 132, a retaining latch 134 appended to push-button member 132, and a compression spring 140 mounted inside buckle case 70 and arranged normally to urge push-button member 132 and retaining latch 134 to the buckle-retaining position. In this position, retaining latch 134 fits into latch-receiving slot 126 formed in buckle tongue 124 (and cover 128) to retain buckle 64 in its retained position.

The technique for manually releasing buckle 64 from its retained position is illustrated in FIG. 11. A user manually pushes against push-button member 130 to move it inwardly in direction 136 into buckle case 70. A flange 138 on push-button member 132 compresses spring 140 as push-button member 132 moves to disengage retaining latch 134 appended to push-button member 132 from latch-receiving slot 126 formed in buckle tongue 124. The user is then able to withdraw buckle 64 in direction 137 to disengage buckle 64 from buckle case 70

Although the invention has been described in detail with reference to certain preferred embodiments, variations, and modifications exist within the scope and spirit of the invention as described and defined in the following claims.

I claim:

1. A child car seat for restraining a child seated in the seat, the child car seat comprising a seat assembly including a seat shell and a swing arm unit and a restraint shield including a fixed portion having spaced-apart first and second ends connected to the swing arm unit and a movable portion configured to move relative to the fixed portion and seat assembly between a plurality of positions, the movable portion being formed to include an interior region and the fixed portion being positioned to lie entirely in the interior region of the movable portion.

2. The child seat of claim 1, wherein the swing arm unit moves along a swing arm unit path to position the restraint shield in front of the seat shell or up and away from the seat shell, the swing arm unit includes first and second swing arms and a spring mechanism configured to apply a bias to the first and second swing arms upwardly away from the seat shell, and each of the first and second swing arms includes a first end coupled to the seat shell and a second end coupled to the restraint shield.

3. The child seat of claim 2, wherein the movable portion moves relative to the swing arm unit as the movable portion moves relative to the fixed portion between the plurality of positions.

4. The child seat of claim 2, further comprising a harness assembly having a first end linked to the seat shell and a second end appended to the restraint shield to retain the swing arm unit in front of the seat shell against the bias of the spring mechanism.

5. The child seat of claim 4, wherein the harness assembly is configured to attach to the restraint shield to move the restraint shield along the swing arm unit path as the movable portion moves between the plurality of positions relative to the fixed portion.

6. The child seat of claim 4, wherein the second end of the harness assembly is positioned to lie in the interior region.

7. The child seat of claim 1, further comprising a crotch strap having a first end linked to the seat assembly and a second end coupled to the fixed portion of the restraint shield.

8. The child seat of claim 7, wherein the fixed portion and movable portion are formed to include crotch strap-receiving apertures and the second end of the crotch strap extends through the crotch strap-receiving apertures of the fixed and movable portions.

9. The child seat of claim 8, further including a seat assembly buckle linked to the seat assembly, the first end of the crotch strap being coupled to the seat assembly buckle, the crotch strap having a first length between the first end of the crotch strap and the crotch strap-receiving aperture of the fixed portion and a second length between the second end of the crotch strap and the crotch strap-receiving aperture of the movable portion, the first length is constant and the second length changes as the movable portion moves relative to the fixed portion.

10. The child seat of claim 7, wherein the fixed portion includes a top side and a cavity in the top side, the restraint shield further including a restraint shield buckle situated within the cavity, and the second end of the crotch strap being appended to the restraint shield buckle.

11. The child seat of claim 7, wherein the seat shell is formed to include a seat bottom portion having a back edge and a seat back portion appended to the back edge and extending upwardly therefrom and the crotch strap is configured to attach to the restraint shield to move the restraint shield downwardly relative to the seat bottom portion of the seat shell as the movable portuon of the restraint shield moves relative to the fixed portion of the restraint shield.

12. The child seat of claim 1, wherein the restraint shield further includes a latch mechanism configured to couple the fixed portion to the movable portion in a plurality of positions.

13. The child seat of claim 12, wherein the latch mechanism is coupled to the movable portion to move with the movable portion as the movable portion moves relative to the fixed portion.

14. The child seat of claim 12, wherein the fixed portion is formed to include first and second spaced-apart detent-receiving notches and the latch mechanism includes a detent lying within the first detent-receiving notch when the restraint shield in a first position and the second detent-receiving notch when the restraint shield is in a second position.

15. The child seat of claim 14, wherein the latch mechanism further includes a grip handle, lever arm extending between the grip handle and detent, and a spring configured to bias the detent into contact with one of the first and second detent-receiving notches.

16. The child seat of claim 15, wherein the fixed portion is further formed to include third and fourth detent-receiving notches and the latch mechanism further includes a second detent spaced apart from the first detent, second lever arm spaced apart from the first lever arm and extending between the grip handle and second detent, and a second spring configured to bias the second detent into engagement with one of the third and fourth detent-receiving notches.

17. The child seat of claim 15, wherein the spring engages the lever arm.

18. The child seat of claim 14, wherein the fixed portion includes a back side and the detent of the latch mechanism lies adjacent to the back side when the restraint shield is in a third position.

19. The child seat of claim 12, wherein the latch mechanism and movable portion cooperate to surround the fixed portion.

20. The child seat of claim 12, further comprising a harness assembly having an end coupled to the fixed portion and positioned to lie in the interior region.

21. The child seat of claim 20, wherein the latch mechanism is coupled to the movable portion to move with the movable portion relative to the end of the harness assembly.

22. The child seat of claim 1, wherein the movable portion includes a top housing shell and a bottom housing shell attached to the housing shell.

23. The child seat of claim 22, wherein the restraint shield further includes a latch mechanism, the bottom housing shell is formed to include a latch-accessing aperture, and the latch mechanism includes a grip handle extending through the latch-accessing aperture.

24. The child seat of claim 22, wherein the restraint shield further includes a latch mechanism coupled to the bottom housing shell to move with the bottom housing shell as the movable portion moves relative to the fixed portion.

25. The child seat of claim 1, wherein the seat shell is formed to include a seat bottom portion having a back edge and a seat back portion appended to the back edge and extending upwardly therefrom, the movable portion of the restraint shield moves between a first position and a second position relative to the fixed portion of the restraint shield and the restraint shield is closer to the seat back portion and the seat bottom portion in the second position than in the first position.

26. The child seat of claim 1, wherein the restraint shield further includes a latch mechanism configured to couple the fixed portion to the movable portion in a plurality of positions, the latch mechanism includes a grip handle, lever arm coupled to the grip handle, and a spring configured to bias the lever into contact with the fixed portion, the lever and spring are positioned to lie wholly in the interior region of the movable portion.

27. The child seat of claim 1, wherein the movable portion includes a pair of shells that cooperate to form the interior region and surround the fixed portion.

28. The child seat of claim 1, wherein the swing arm unit includes first and second swing arms, the first end of the fixed portion is connected to the first swing arm, and the second end of the fixed portion is connected to the second swing arm.

29. The child seat of claim 1, wherein the fixed portion includes an upper surface facing upwardly toward the movable portion and a lower surface facing downwardly toward the movable portion.

30. A child car seat for restraining a child seated in the car seat, the child car seat comprising a seat assembly and a restraint shield having a fixed portion coupled to the seat assembly and a movable portion configured to move relative to the fixed portion and seat assembly between a plurality of positions, the movable portion being formed to include an interior region and the fixed portion being positioned to lie in the interior region of the movable portion, the movable portion includes a top housing shell and a bottom housing shell attached to the top housing shell, wherein the bottom housing shell is formed to include a plurality of spaced-apart post-receiving apertures, the top housing shell is formed to include a plurality of spaced-apart posts extending downwardly toward the bottom housing shell and into the plurality of spaced-apart post-receiving apertures, the fixed portion is formed to include a plurality of spaced-apart post-receiving slots, and the plurality of spaced-apart posts travel through the plurality of spaced-apart post-receiving slots as the movable portion moves relative to the fixed portion.

31. A child car seat for restraining a child seated in the car seat, the child car seat comprising a seat assembly, and a restraint shield having a fixed portion coupled to the seat assembly and a movable portion configured to move relative to the fixed portion and seat assembly between a plurality of positions, the movable portion being formed to include an interior region and the fixed portion being positioned to lie in the interior region of the movable portion, the movable portion includes a top housing shell and a bottom housing shell attached to the top housing shell, wherein the fixed portion is formed to include spaced-apart guide-receiving slots and one of the top housing shell and bottom housing shell includes spaced-apart guides configured to travel through the spaced-apart guide-receiving slots of the fixed portion as the movable portion moves relative to the fixed portion.

32. A child car seat for restraining a child seated in the car seat, the child car seat comprising a seat assembly, and a restraint shield including a fixed portion coupled to the seat assembly, a movable portion movable relative to the fixed portion, and a latch mechanism configured to couple the fixed and movable portions in a plurality of positions, the latch mechanism being coupled to the movable portion to move with the movable portion as it moves relative to the fixed portion between the plurality of positions.

33. The child car seat of claim 32, wherein the seat assembly includes a seat shell, the seat shell is formed to include a seat bottom portion having a back edge and a seat back portion appended to the back edge and extending upwardly therefrom and the movable portion moves between its plurality of positions substantially parallel to the seat bottom portion.

34. The child car seat of claim 32, wherein the fixed portion is formed to include first and second detent-receiving notches, the latch mechanism includes a detent situated in the first detent-receiving notch when the movable portion of the restraint shield is in a first position relative to the fixed portion and situated in the second detent-receiving notch when the movable portion of the restraint shield is in a second position relative to the fixed portion.

35. The child seat of claim 32, wherein the seat assembly includes a seat shell and a swing arm unit, the swing arm unit includes first and second swing arms, and each of the first and second swing arms includes a first end appended to the seat shell and a second end appended to the fixed portion of the restraint shield.

36. The child seat of claim 32, further comprising a crotch strap having a first end anchored to the seat assembly and a second end anchored to the restraint shield, the second end of the crotch strap remaining stationary relative to the fixed portion of the restraint shield as the movable portion of the restraint shield moves relative to the fixed portion.

37. The child car seat of claim 37, wherein the second end of the crotch strap is appended to the fixed portion of the restraint shield.

38. A child car seat for restraining a child seated in the car seat, the child car seat comprising a seat assembly including a seat shell, the seat shell being formed to include a seat bottom portion having a back edge and a seat back portion appended to the back edge and extending upwardly therefrom, a restraint shield having a fixed portion coupled to the seat assembly and a movable portion configured to move relative to the fixed portion, and a crotch strap having a first end linked to the seat bottom portion and a second end appended to the fixed portion of the restraint shield to move the restraint shield downwardly relative to the seat bottom portion as the movable portion of the restraint shield moves relative to the fixed portion of the restraint shield.

39. The child seat of claim 38, wherein the fixed portion and movable portion include crotch strap-receiving apertures and the second end of the crotch strap extends through the crotch strap-receiving apertures of the fixed portion and movable portion.

40. The child seat of claim 39, further including a seat shell buckle linked to the seat bottom portion, the first end of the crotch strap being coupled to the seat shell buckle, the crotch strap having a first length between the first end of the crotch strap and the crotch strap-receiving aperture of the fixed portion and a second length between the first end of the crotch strap and the crotch strap-receiving aperture of the movable portion, the first length is constant and the second length changes as the movable portion moves relative to the fixed portion.

41. The child seat of claim 40, wherein the seat assembly further includes a swing arm unit that moves along a swing and path, the swing arm unit includes first and second swing arms and a spring mechanism biasing the first and second swing arms upwardly away from the seat bottom portion, each of the first and second swing arms having a first end appended to the seat shell and a second end appended to the fixed portion of the restraint shield, the crotch strap moves the restraint shield and swing and unit downwardly along the swing arm path relative to the seat bottom portion as the second length of the crotch strap changes when the movable portion of the restraint shield moves relative to the fixed portion of the restraint shield.

42. A child car seat for restraining a child seated in the car seat, the child car seat comprising a seat shell formed to include a seat bottom portion having a back edge and a seat back portion appended to the back edge and extending upwardly therefrom, a restraint shield having a fixed portion, a movable portion configured to move relative to the fixed portion, and a latch mechanism configured to couple the fixed portion to the movable portion in a plurality of positions, a swing arm unit having first and second swing arms and a spring mechanism configured to bias the first and second swing arms upwardly away from the seat bottom portion, each of the first and second swing arms having a first end appended to the seat shell and a second end appended to the fixed portion of the restraint shield, and a crotch strap having a first end linked to the seat portion and a second end appended to the fixed portion of the restraint shield, the crotch strap being configured to move the restraint shield downwardly against the bias of the spring mechanism relative to the seat bottom portion as the movable portion of the restraint shield moves relative to the fixed portion of the restraint shield.

43. A child car seat for restraining a child seated in the car seat, the child car seat comprising a seat assembly, and a restraint shield including a fixed portion coupled to the seat assembly, a movable portion movable relative to the fixed portion, and a latch mechanism configured to couple the fixed and movable portions in a plurality of positions, the latch mechanism including a grip portion, detent, lever arm configured to extend between the grip portion and detent, and spring configured to bias the lever arm and detent about a pivot axis toward a detent-receiving aperture formed in one of the movable portion and the fixed portion.

44. A child car seat for restraining a child seated in the car seat, the child car seat comprising a seat assembly and a restraint shield having a fixed portion coupled to the seat assembly and a movable portion configured to move relative to the fixed portion and seat assembly between a plurality of positions, the movable portion including a top housing shell and a bottom housing shell attached to the top housing shell, the bottom housing shell having an upper surface facing upwardly toward the top housing shell, the fixed portion including an upper surface facing upwardly toward the top housing shell of the movable portion and a lower surface facing downwardly toward the upper surface of the bottom housing shell of the movable portion.

45. The child seat of claim 44, wherein the top and bottom housing shells of the movable portion define an interior region and the child seat further comprises a harness assembly having an end coupled to the fixed portion and positioned to lie in the interior region.

46. The child seat of claim 44, wherein the restraint shield further includes a latch mechanism configured to couple the fixed portion to the movable portion in a plurality of positions and the latch mechanism and movable portion cooperate to surround the fixed portion.

47. A child car seat for restraining a child seated in the car seat, the child car seat comprising a seat assembly, and a restraint shield having a fixed portion coupled to the seat assembly and a movable portion configured to move relative to the fixed portion and seat assembly between a plurality of positions, the movable portion includes a top housing shell and a bottom housing shell attached to the top housing shell, wherein the fixed portion is formed to include spaced-apart guide-receiving slots and one of the top housing shell and bottom housing shell includes spaced-apart guides configured to travel through the spaced-apart guide-receiving slots of the fixed portion as the movable portion moves relative to the fixed portion.

48. The child seat of claim 47, wherein the top and bottom housing shells of the movable portion define an interior region and the spaced-apart guides are positioned to lie entirely in the interior region.

49. The child seat of claim 47, wherein the top and bottom housing shells of the movable portion define an interior region and the spaced-apart guide-receiving slots are formed in the fixed portion to lie entirely in the interior region.

* * * * *